United States Patent
Newman et al.

(10) Patent No.: US 6,355,745 B1
(45) Date of Patent: Mar. 12, 2002

(54) SYNDIOTACTIC MONOVINYLIDENE AROMATIC POLYMERIZATION PROCESS

(75) Inventors: Thomas H. Newman, Midland; Karen K. Borodychuk, Mt. Pleasant, both of MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/701,897

(22) PCT Filed: Apr. 19, 1999

(86) PCT No.: PCT/US99/08565

§ 371 Date: Dec. 4, 2000

§ 102(e) Date: Dec. 4, 2000

(87) PCT Pub. No.: WO00/00523

PCT Pub. Date: Jan. 6, 2000

Related U.S. Application Data

(60) Provisional application No. 60/091,287, filed on Jun. 30, 1998.

(51) Int. Cl.$^7$ ............................. C08F 4/643; C08F 12/04
(52) U.S. Cl. ..................... 526/132; 526/128; 526/133; 526/160; 526/346; 502/118; 502/152
(58) Field of Search ................................. 526/128, 132, 526/133, 346, 160; 502/152, 118

(56) References Cited

U.S. PATENT DOCUMENTS

| | | | |
|---|---|---|---|
| 5,296,433 A | * | 3/1994 | Siedle et al. ................. 502/117 |
| 6,066,706 A | * | 5/2000 | Santi et al. .............. 526/133 X |
| 6,225,426 B1 | * | 5/2001 | Gillis et al. ............. 526/133 X |

* cited by examiner

Primary Examiner—Fred Teskin

(57) ABSTRACT

A process for preparing syndiotactic monovinylidene aromatic polymers comprising contacting one or more monovinylidene aromatic monomers with a catalyst composition comprising a Group 4 metal complex and an activating cocatalyst composition comprising an aluminoxane and an electrophilic borane compound.

8 Claims, No Drawings

SYNDIOTACTIC MONOVINYLIDENE AROMATIC POLYMERIZATION PROCESS

CROSS REFERENCE STATEMENT

This application claims the benefit of Provisional Application Ser. No. 60/091,287, filed Jun. 30, 1998.

BACKGROUND OF THE INVENTION

The present invention relates to a process for polymerizing monovinylidene aromatic monomers, such as styrene, to produce polymers having a high degree of syndiotacticity, using a catalyst composition comprising a Group 4 metal complex.

In U.S. Pat. No. 4,680,353, there is disclosed a process for the preparation of syndiotactic polymers of monovinylidene aromatic monomers, using a catalyst system comprising a titanium catalyst and an alumoxane cocatalyst. However, this process uses relatively high amounts of cocatalyst which increases the cost of production.

WO93/03067 discloses a process for the preparation of syndiotactic polymers using a catalyst comprising a borane metal complex. However, this process generally yields lower catalyst activity and higher residual metal in the polymer.

Therefore, there remains a need for an activating cocatalyst composition which yields high catalyst activity and requires less aluminoxane, thus producing a polymer having lower levels of residual aluminum.

SUMMARY OF THE INVENTION

One aspect of the present invention is an activating cocatalyst composition used in the production of syndiotactic polymers from monovinylidene aromatic monomers wherein the composition comprises an aluminoxane and an electrophilic borane compound.

Another aspect of the present invention is a process for preparing syndiotactic polymers from monovinylidene aromatic monomers comprising contacting at least one polymerizable monovinylidene aromatic monomer under polymerization conditions with a catalyst composition comprising:

a) a Group 4 metal complex; and b) an activating cocatalyst composition comprising an aluminoxane and an electrophilic borane compound.

This activating cocatalyst composition and process allows for the reduction in the amount of aluminoxane needed for high catalyst activity, thus decreasing the amount of residual aluminum in the polymer and lowering catalyst cost. The resulting syndiotactic polymers may be used in the preparation of articles such as a moldings, films, sheets and foamed objects.

DETAILED DESCRIPTION OF THE INVENTION

The present invention is a method of producing a syndiotactic monovinylidene aromatic polymer. As used herein, the term "syndiotactic" refers to polymers having a stereoregular structure of greater than 50 percent syndiotactic of a racemic triad as determined by $^{13}C$ nuclear magnetic resonance spectroscopy. Such polymers may be usefully employed in the preparation of articles and objects (for example, via compression molding, injection molding or other suitable technique) having an extremely high resistance to deformation due to the effects of temperature.

In the practice of the present invention, suitable monovinylidene aromatic monomers useful in preparing the syndiotactic monovinylidene aromatic polymers include those represented by the formula:

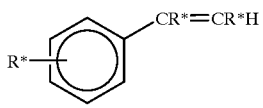

wherein each R* is independently hydrogen; an aliphatic, cycloaliphatic or aromatic hydrocarbon group having from 1 to 10, more suitably from 1 to 6, most suitably from 1 to 4, carbon atoms; or a halogen atom. Examples of such monomers include, styrene, chlorostyrene, n-butylstyrene, vinyltoluene, and α-methylstyrene, with styrene being especially suitable. Copolymers of styrene and the above monovinylidene aromatic monomers other than styrene can also be prepared.

The catalyst composition used in the process of the present invention comprises a Group 4 metal complex and an activating cocatalyst composition. All reference to the Periodic Table of the Elements herein shall refer to the Periodic Table of the Elements, published and copyrighted by CRC Press, Inc., 1989. Also, any reference to a Group or Series shall be to the Group or Series as reflected in this Periodic Table of the Elements, utilizing the IUPAC system for numbering groups.

The Group 4 metal complex preferably corresponds to the formula:

wherein:

Cp is a single $\eta^5$-cyclopentadienyl or $\eta^5$-substituted cyclopentadienyl group, the substituted cyclopentadienyl group being optionally also bonded to M through a substituent X;

M is a metal of Group 4 or the Lanthanide Series of the Periodic Table;

X each occurrence is an inert anionic ligand of up to 20 nonhydrogen atoms and optionally X and Cp are joined together;

X' is an inert, neutral donor ligand;

m and p are independently 0 or 1;

n is an integer greater than or equal to 1; and the sum of m and n is equal to the oxidation state of the metal.

Illustrative but nonlimiting examples of X include hydrocarbyl, silyl, halo, $NR_2$, $PR_2$, OR, SR, and $BR_2$, wherein R is $C_{1-20}$ hydrocarbyl.

Illustrative but nonlimiting examples of X' include ROR, RSR, $NR_3$, $PR_3$, and $C_{2-20}$ olefins or diolefins, wherein R is as previously defined. Such donor ligands are able to form shared electron bonds but not a formal covalent bond with the metal.

Preferred monocyclopentadienyl and substituted monocyclopentadienyl groups for use according to the present invention are more specifically depicted by the formula:

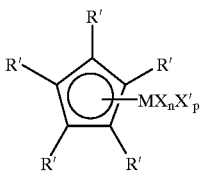

wherein:

M is titanium;

X independently each occurrence is hydrogen, halide, R, or OR;

R is $C_{1-10}$ hydrocarbyl group;

X' is a $C_{4-40}$ conjugated diene;

n is 1, 2 or 3;

p is 1 when n is 1, and p is 0 when n is 2 or 3;

R' is in each occurrence independently selected from the group consisting of hydrogen, halogen, R, $NR_2$, $PR_2$; OR; SR or $BR_2$, or one or two pairs of adjacent R' hydrocarbyl groups are joined together forming a fused ring system.

Preferably, the cyclic moiety comprises a cyclopentadienyl- indenyl-, fluorenyl-, tetrahydrofluorenyl-, or octahydrofluorenyl-group or a $C_{1-6}$ hydrocarbyl substituted derivative thereof, n is three, p is zero, X is $C_{1-4}$ alkyl or alkoxide. Most highly preferred metal complexes comprise pentamethylcyclopentadienyltitanium trimethyl, pentamethylcyclopentadienyltitanium tribenzyl, pentamethylcyclopenta-dienyltitanium trimethoxide, octahydrofluorenyltitanium tribenzyl, octahydrofluorenyltitanium trimethyl or octahydrofluorenyltitanium trimethoxide.

In a preferred embodiment, the metal complex is a metal trialkoxide which is combined with a trialkylaluminum or trialkylboron compound such as triethyl aluminum, tri-n-propyl aluminum, tri-isopropyl aluminum, tri-n-butyl aluminum, triisobutyl aluminum, and mixtures thereof, either prior to or simultaneously with the activating cocatalyst composition to form the active catalyst composition. It is believed, without wishing to be bound by such belief that the trialkylaluminum compound or trialkylboron compound causes the in situ transfer of the alkyl group to the Group 4 metal complex prior to activation thereof.

The Group 4 metal complexes are rendered catalytically active by combination with an activating cocatalyst. The cocatalyst composition of the present invention comprises an aluminoxane and an electrophilic borane compound.

Suitable aluminoxanes for use herein include polymeric or oligomeric aluminoxanes, especially methylalumoxane (MAO), isobutylaluminoxane, triisobutyl aluminum modified methylalumoxane, isopropyl alumoxane or diisobutylalumoxane. A preferred aluminoxane is methylalumoxane.

Electrophilic boranes suitable for use herein include tri(hydrocarbyl)boron compounds and halogenated derivatives thereof, having from 1 to 10 carbons in each hydrocarbyl or halogenated hydrocarbyl group, especially tris(fluoroaryl) boranes, tris(trifluoromethyl substituted aryl)boranes, and tris(pentafluorophenyl)borane. Preferably, the borane is tris (pentafluorophenyl)borane. Activating cocatalysts and activating techniques have been previously taught with respect to different metal complexes in the following references: EP-A-277,003, U.S. Pat. Nos. 5,153,157, 5,064,802, EP-A-468,651, EP-A-520,732, and WO93/23412, the teachings of which are hereby incorporated by reference.

The aluminoxane and electrophilic borane compound are preferably premixed prior to their addition to the Group 4 metal catalyst. Typical mole ratios of aluminoxane/borane are from 1:1 to 150:1, preferably from 2:1 to 100:1, more preferably from 3:1 to 50:1, and most preferably from 5:1 to 20:1.

The cocatalyst premix composition of aluminoxane/borane is preferably contacted with the Group 4 metal catalyst prior to the polymerization. Typical mole ratios of catalyst/cocatalyst composition are 1:5:1 to 1:150:20 catalyst:aluminoxane:borane, preferably 1:25:2 to 1:125:15 catalyst:aluminoxane:borane and most preferably 1:50:4 to 1:75:8 catalyst:aluminoxane:borane.

The foregoing activating cocatalyst composition can also be used in combination with a tri(hydrocarbyl)aluminum compound having from 1 to 10 carbons in each hydrocarbyl group. These aluminum compounds are usefully employed for their beneficial ability to scavenge impurities such as oxygen, water, and aldehydes from the polymerization mixture. The molar ratio of aluminum compound to metal complex is preferably from 10,000:1 to 1:1, more preferably from 5000:1 to 10:1, most preferably from 200:1 to 25:1.

Preferred aluminum compounds include $C_{2-6}$ trialkyl aluminum compounds, especially those wherein the alkyl groups are ethyl, propyl, isopropyl, n-butyl, isobutyl, pentyl, neopentyl, or isopentyl, dialkyl(aryloxy)aluminum compounds containing from 1–6 carbons in the alkyl group and from 6 to 18 carbons in the aryl group, (especially 3,5-di(t-butyl)-4-methylphenoxy)diisobutylaluminum.

An especially preferred activating cocatalyst composition comprises the combination of a trialkyl aluminum compound having from 1 to 4 carbons in each alkyl group, tris(pentafluorophenyl)borane and methylaluminoxane in a molar ratio from 5:1:25 to 25:8:75.

The catalyst composition is preferably prepared separately prior to contact with polymerizable monomers. In general, the catalyst composition can be prepared by combining the metal complex and activating cocatalyst composition at a temperature within the range of from 10° C. to 100° C. The components of the catalyst composition can optionally be combined in an inert solvent such as toluene. The catalysts' components are sensitive to both moisture and oxygen and should be handled and transferred in an inert atmosphere.

The catalyst composition can also be a neat solution obtained by combining the components in the absence of diluent. When MAO is used as the activating cocatalyst, the catalyst premix will comprise from about 45 to 85 percent solvent due to the solvent present in commercial MAO.

Additionally, the polymerization can be conducted in the presence of a catalyst adjuvant. Catalyst adjuvants such as alkylsilane, substituted alkylsilanes, dialkylsilanes, substituted dialkylsilanes, arylsilanes, diarylsilanes, substituted arylsilanes or substituted diarylsilanes can also be used. Preferred adjuvants include diphenylsilane and phenylsilane.

The polymerization may be conducted in the presence of an inert diluent or solvent or in the absence thereof, that is, in the presence of excess monomer. Examples of suitable diluents or solvents include $C_{6-20}$ aliphatic, cycloaliphatic, aromatic and halogenated aliphatic or aromatic hydrocarbons, as well as mixtures thereof. Preferred diluents comprise the $C_{6-10}$ alkanes, toluene and mixtures thereof. A particularly desirable diluent for the polymerization is iso-octane, iso-nonane or blends thereof such as Isopar-E™, available from Exxon Chemical Company. Suitable amounts of solvent are employed to provide a monomer concentration from 5 percent to 100 percent by weight. The polymerization can also be conducted under any suitable conditions such as bulk, slurry, or suspension polymerization conditions.

The polymerization is preferably conducted under solventless conditions such as bulk polymerization conditions or other suitable reaction conditions including solid, powdered reaction conditions. The polymerization can be conducted at temperatures of from 0° C. to 160° C., preferably from 25° C. to 100° C., more preferably from 30° C. to 80° C., for a time sufficient to produce the desired polymer. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as super-atmospheric pressure, suitably at a pressure within the range of 1 to 500 psig (6.9 kPa–3,400 kPa). The use of ambient or low pressures, for example, 1–5 psig (6.9–34.5 kPa) is preferred in view of lower capital and equipment costs.

The molar ratio of the monovinylidene aromatic monomer to metal catalyst (in terms of Moles) may range from 100:1 to $1 \times 10^{10}$:1, preferably from 1000:1 to $1 \times 10^{6}$:1.

As in other similar polymerizations, it is highly desirable that the monomers employed be of sufficiently high purity that catalyst deactivation does not occur. Any suitable technique for monomer purification such as devolatilization at reduced pressures, contacting with molecular sieves or high surface area alumina, deaeration, or a combination thereof may be employed.

Purification of the resulting polymer to remove entrained catalyst and cocatalyst may also be desired by the practitioner. Such contaminants may generally be identified by residues of ash on pyrolysis of the polymer that are attributable to catalyst or cocatalyst metal values. A suitable technique for removing such compounds is by solvent extraction, for example, extraction utilizing hot, high boiling chlorinated solvents, acids or bases such as caustic followed by filtration.

Having described the invention, the following examples are provided as further illustrative and are not to be construed as limiting. The skilled artisan will appreciate that the invention disclosed herein may be practiced in the absence of any component which has not been specifically disclosed. Unless stated to the contrary, all parts and percentages are based on weight.

EXAMPLES 1–4

All reactions are conducted under inert atmosphere in a dry box. Styrene monomer is purified by removing oxygen, passing through activated alumina, and hydrogenation using Pd on alumina to remove phenylacetylene. Solvent, it used, is purified by sparging with $N_2$ and passing through activated alumina and handled using standard inert atmosphere techniques.

The appropriate amount of methylaluminoxane (MAO) (10 percent by weight solution in toluene) and tris(pentafluorophenyl)borane are combined with 3 ml of toluene and stirred for 16 hours at approximately 25° C. Triisobutylaluminium (TIBA)(750 μl of a 1 M solution in toluene) and octahydrofluorenyltitanium trimethoxide (1000 μl of a 0.03 M solution in toluene) and enough additional toluene to dilute the mixture to 10 ml of total volume is added to the MAO/borane cocatalyst composition.

Polymerizations are conducted in septum capped, crimp sealed ampoules. The ampoules are charged with 10 ml of styrene. Each catalyst composition is placed in a septum capped, crimp sealed ampoule and removed from the dry box. The ampoules are equilibrated at the polymerization temperature for 10 minutes. Polymerizations are initiated via addition of the desired amount of catalyst solution described above. The mole ratio of styrene to titanium is 200,000:1. After 30 minutes reaction time the polymerization is quenched by the addition of methanol. Each polymer sample is isolated and dried at 150° C. for 30 minutes and 250° C. for 30 minutes, then weighed in order to determine the percent conversion. Molecular weight of the resulting syndiotactic polymer is determined via standard solution viscometry using atactic polystyrene standards. All polymers have melting points in excess of 260° C. consistent with tacticities of greater than 50 percent based on a racemic triad. Results are shown in TABLE I.

Comparative Examples are prepared by the same method without the addition of the borane.

TABLE I

| Ex. | MAO:TiBA:Borane:Ti | Conversion (percent) |
|---|---|---|
| 1 | 50:25:8:1 | 55.1 |
| 2 | 50:10:4:1 | 27.5 |
| 3* | 50:25:0:1 | 40.8 |
| 4* | 50:10:0:1 | 15.7 |

*Comparative Examples

The percent conversions are higher for the compositions containing borane in the catalyst composition.

EXAMPLES 5–10

The procedure of Examples 1–4 are repeated with the exception that Examples 7 and 8 do not have premixing catalyst components. The components, for example borane, aluminoxane, and catalyst, are each added individually to the monomer.

TABLE II

| Example | MAO:TIBA:Borane:Ti | Conversion (percent) |
|---|---|---|
| 5 | 50:25:8:1 | 50.3 |
| 6 | 50:10:4:1 | 49.1 |
| 7* NO PREMIXING | 50:25:8:1 | 8.1 |
| 8* NO PREMIXING | 50:10:4:1 | 11.4 |
| 9* | 0:25:8:1 | 4.0 |
| 10* | 0:10:4:1 | 1.5 |

*Comparative Examples

Examples 5 and 6 show the increased conversion and efficiency of the catalyst and activating cocatalyst when compared to comparative examples 7 and 8 with no premixing. Comparative examples 9 and 10 show the effect of borane without MAO which has very low conversion.

What is claimed is:

1. A process for preparing syndiotactic polymers from monovinylidene aromatic monomers comprising contacting one or more monovinylidene aromatic monomers under polymerization conditions with a catalytically effective amount of a catalyst composition comprising:

a) a metal complex corresponding to the formula:

$$Cp_mMX_nX'_p$$

wherein:
Cp is a single $\eta^5$-cyclopentadienyl or $\eta^5$-substituted cyclopentadienyl group, the substituted cyclopentadienyl group being optionally also bonded to M through a substituent X;

M is a metal of Group 4 or the Lanthanide series of the Periodic Table;

X each occurrence is an inert anionic ligand of up to 20 nonhydrogen atoms and optionally X and Cp are joined together;

X' is an inert, neutral donor ligand;

m and p are independently 0 or 1;

n is an integer greater than or equal to 1; and the sum of m and n is equal to the oxidation state of the metal;

b) an activating cocatalyst composition comprising an aluminoxane and an electrophilic borane compound.

2. The process according to claim 1 wherein the monovinylidene aromatic monomer is represented by the formula:

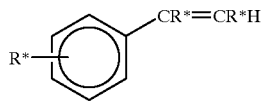

wherein each R* is independently hydrogen; an aliphatic, cycloaliphatic or aromatic hydrocarbon group having from 1 to 10 carbon atoms; or a halogen atom.

3. The process according to claim 2 wherein the monovinylidene aromatic monomer is styrene.

4. The process according to claim 1 wherein the Group 4 metal complex corresponds to the formula:

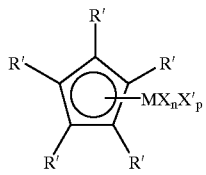

wherein:

M is titanium;

X independently each occurrence is hydrogen, halide, R, or OR;

R is $C_{1-10}$ hydrocarbyl group;

X' is a $C_{4-40}$ conjugated diene;

n is 1, 2 or 3;

p is 1 when n is 1, and p is 0 when n is 2 or 3;

R' each occurrence is independently selected from the group consisting of hydrogen, halogen, R, $NR_2$, $PR_2$; OR; SR or $BR_2$, or one or two pairs of adjacent R' hydrocarbyl groups are joined together forming a fused ring system.

5. The process according to claim 1 wherein the aluminoxane is methylaluminoxane.

6. The process according to claim 1 wherein the electrophilic borane is tris(fluoroaryl)borane.

7. The process according to claim 1 wherein an adjuvant is additionally present and is phenylsilane or diphenylsilane.

8. The process of claim 1 wherein the catalyst composition comprises:

a) a pentamethyleyclopentadienyltitanium tri(C1–4) alkoxide or an octahydrofluorenyltitanium tri(C1–4) alkoxide in combination with a tri(C1–6) alkylaluminum; and b) methylalumoxane and an electrophilic borane compound.

* * * * *